Dec. 13, 1938.   R. N. WALLACH ET AL   2,140,341
PROCESS FOR TREATING MATERIALS
Filed Oct. 28, 1937
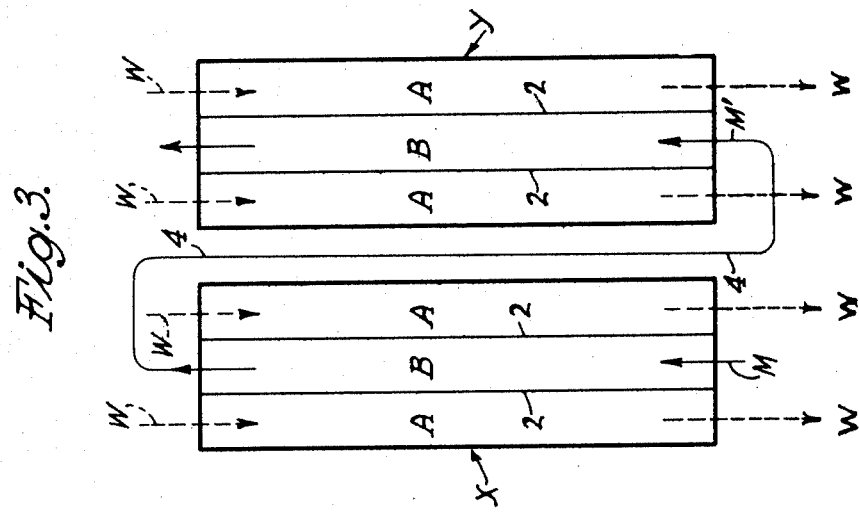
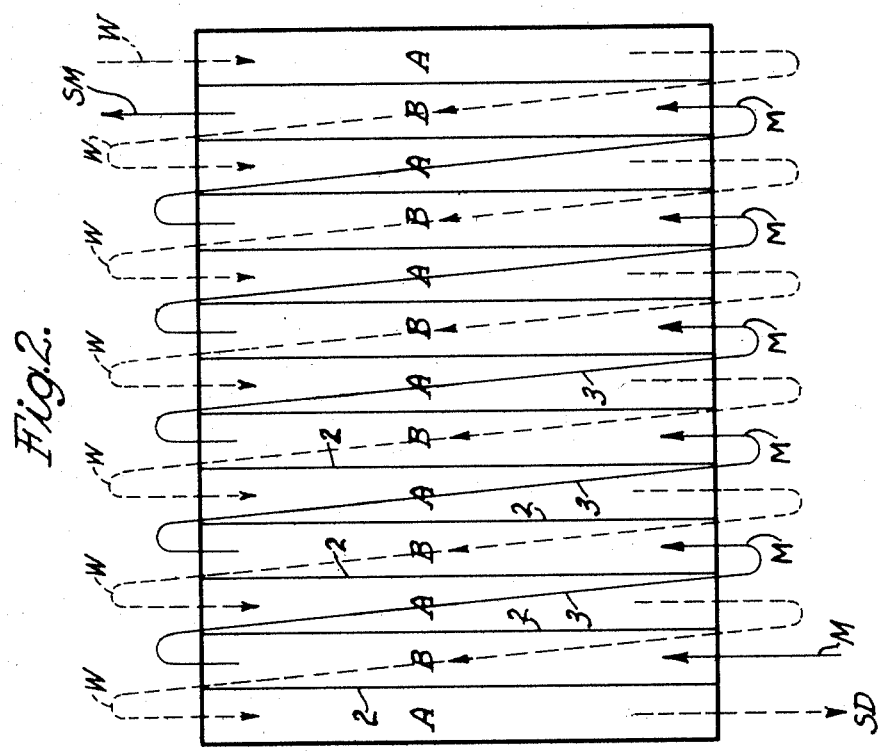
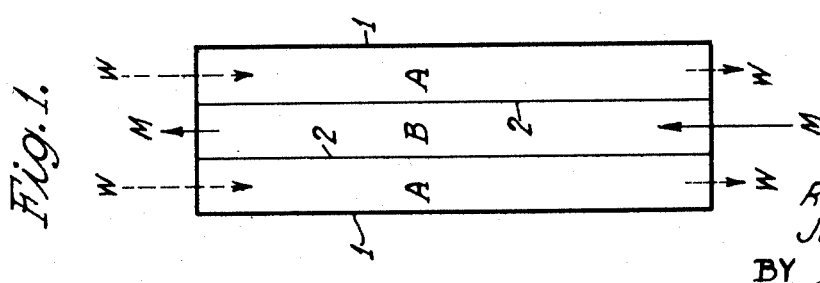
INVENTORS
ROGER N. WALLACH
JUSTIN ZENDER
BY John M. Leach
ATTORNEY Patented Dec. 13, 1938

2,140,341

UNITED STATES PATENT OFFICE 2,140,341

PROCESS FOR TREATING MATERIALS

Roger N. Wallach, Briarcliff Manor, and Justin Zender, Irvington, N. Y.; said Wallach assignor to Sylvania Industrial Corporation, Fredericksburg, Va., a corporation of Virginia, and said Zender assignor to Stauffer Chemical Company, New York, N. Y., a corporation of California Application October 28, 1937, Serial No. 171,542

4 Claims. (Cl. 127—54)

The present invention relates in general to a process of extracting the sugars from colloidal dispersions, such as molasses. More particularly, it relates to a process of extracting the sugars from molasses and other colloidal dispersions by dialysis, and to an apparatus for effecting such extraction.

The general object of the present invention is to provide an efficient and highly improved process and apparatus for recovering sugars from molasses and other colloidal dispersions.

A specific object of the invention is to provide an improved process of separating sugars from molasses and other colloidal dispersions by dialysis.

Another specific object of the invention is to provide a process of directly extracting sugars from molasses and other colloidal dispersions by dialysis.

A further specific object of the invention is to provide an apparatus for directly extracting sugars from molasses and other colloidal dispersions by dialysis.

Other objects of the invention will in part be obvious and will in part appear hereinafter.

In the extraction of sugars from molasses and other colloidal dispersions heretofore, it has been customary to dialyze the dispersion with water, using a parchment paper membrane, to remove inorganic salts only. The saline-water solution thus obtained is usually concentrated to permit extraction of the potassium salts. The dialyzed, salt-free molasses is then boiled in a vacuum pan, crystallized while in motion and the resulting sugar purified in the ordinary way. The molasses thus separated is usually again dialyzed, reboiled and crystallized. Although this process has been largely used, it is financially unsuccessful due to the size of the equipment necessary, the extreme dilution of the dialyzed molasses, the expense of evaporation and the small yield of sugars.

For the purpose of explanation, the present invention will be described in connection with molasses, but it is to be understood that it is equally applicable to other colloidal dispersions.

In the practice of the present invention, a non-fibrous dialysis membrane composed of a hydrophilic colloidal material is used to extract the sugars from molasses and other colloidal dispersions. By the use of such a diaphragm, superior results are obtained since substantially all of the other substances present in the colloidal dispersion are left behind. This may be due in part to the homogeneity of the membrane and in part to the hydrophilic nature of the membrane material. The lack of fibrous material in the membrane increases the uniformity of its permeability, and the fact that the material of the membrane is hydrophilic possibly causes it to have a selective permeability for substances containing the hydroxyl group, and to be relatively impermeable to substances which do not include the hydroxyl group. These features are of particular importance when it is considered that molasses, for example, contains many substances other than sugar. A typical industrial molasses has been found to contain, in addition to sugars, proteins and gums, as well as organic acids, other organic matter and inorganic salts.

The dialysis membrane is preferably composed of a water-swelling, non-fibrous cellulosic material such as cellulose hydrate (Cellophane) from which glycerine or other plasticizers have been removed.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing, in which:

Fig. 1 diagrammatically illustrates apparatus for carrying out the process of the present invention;

Fig. 2 diagrammatically illustrates apparatus for performing a continuous process of the invention; and Fig. 3 diagrammatically illustrates apparatus for carrying out another embodiment of the process of the invention.

The membrane employed in carrying out the process of the invention may be composed of any suitable non-fibrous pellicle of hydrophilic cellulosic material which is pervious to the sugars, but impervious to the colloids contained in the liquid to be dialyzed. The use of cellulose hydrate membranes is highly desirable, and hence greatly preferred, but non-fibrous membranes composed of other hydrophilic materials may be used, for example, cellulose ethers, oxy and hydroxy alkyl ethers of cellulose, or the like.

The cellulose hydrate membrane may be produced by regeneration from viscose, cuprammonium solutions of cellulose, inorganic or organic solutions of cellulose or by the de-esterification of cellulose esters such as cellulose nitrate or by any other suitable process. If commercial Cellophane is employed, it should be treated to remove any glycerine or other plasticizer contained therein before use.

In general, the process comprises passing molasses or other colloidal dispersion and water preferably countercurrently through adjacent chambers which are separated by a membrane of the type hereinbefore described. During the flow of these fluids, the water will extract the sugars from the colloidal dispersions by osmosis. The sugars may be recovered from the dialyzate by known methods, or this aqueous sugar solution may be fermented continuously or by the batch process to form various organic compounds.

Any suitable type of cane, corn or beet molasses may be treated according to the invention to recover sugars therefrom. The salts normally present in molasses may be removed therefrom before extraction of sugars or the salts may be extracted along with the sugars and subsequently removed from the aqueous sugar dialyzate. The process of the invention is susceptible of being carried out in a batch or in a continuous manner. Some of the various colloidal dispersions which may be treated in accordance with the present invention to remove sugars are latex, distillers' slop, blood, milk, plant saps and vegetable and fruit juices.

In Fig. 1, there is shown diagrammatically a suitable dialyzer for carrying out the process of the invention. This apparatus comprises outer chambers A adjacent the end walls 1 and an intermediate chamber B, the chambers being separated by semi-permeable membranes 2 composed preferably of non-fibrous cellulose hydrate (Cellophane). The molasses to be dialyzed is caused to flow through the intermediate chamber B and water is caused to flow through the outer chambers A in a direction counter-current to the flow of molasses in the intermediate chamber B, the molasses being preferably caused to flow in an upwardly direction and under a pressure greater than that of the water. The dialyzate comprising water and sugar is withdrawn at the bottom of each of the chambers A and may be recirculated through the same chambers if so desired in order to build up the sugar concentration in the aqueous solution. The molasses which is diluted with water during the dialyzing process may also be further dialyzed with the original dialyzate or fresh water by recirculating it through chamber B. After the sugar content of the molasses has been substantially exhausted, it may be discarded or the residual sugars may be fermented to alcohol by adding a suitable organism to the spent liquor.

The molasses passed through the chamber B may have previously been dialyzed with water through a suitable membrane for the removal of salts. When beet molasses is employed, it is preferably rendered substantially salt-free by a preliminary dialysis with water through any selective membrane. Thereafter, fresh water is employed and the beet sugar dialyzed from the salt-free molasses by using a non-fibrous membrane comprising hydrophilic colloidal material. If desired, the salts may be removed from the aqueous sugar dialyzate by precipitation instead of by pre-dialysis.

The sugar removing process may be carried out continuously by employing apparatus of the type diagrammatically illustrated in Fig. 2 which may comprise a series of alternating water and molasses chambers A and B, respectively. All of the water chambers and all of the molasses chambers are respectively interconnected and the chambers A and B are separated by membranes 2 of the type hereinbefore disclosed. In the operation of this embodiment of the apparatus, molasses is caused to flow through the alternatively disposed chambers B as indicated by the solid arrows M, and water is passed through the chambers A in the manner indicated by the dotted arrows W so that a countercurrent flow of the fluids results on opposite sides of the membrane. In each instance the molasses enters the bottom of each chamber B and is passed upwardly, withdrawn from the top thereof and conveyed through the conduits 3 to the bottom of the next chamber B in the series. The water follows a like path, but in reverse order as it enters the top of each chamber A, flows downwardly therethrough, is withdrawn from the bottom of the chamber and conveyed to the top of the next chamber A in the series. As shown in Fig. 2, molasses enters the dialyzer at M and the spent molasses is finally withdrawn at SM, and the water enters at the opposite end W and the sugar dialyzate is withdrawn at SD. The number of chambers in the series as well as the rate of flow of the molasses and water may be varied to suit the conditions of the process.

It is also within the purview of the invention to employ a dialyzer comprising a series of units of the type shown in Fig. 1, wherein each molasses chamber B is bordered on each side with a separate water chamber A, i. e. the series would comprise chambers in the following order: A, B, A, A, B, A, etc., an impermeable partition being provided between the adjacent chambers A.

A modified form of apparatus for continuously extracting the sugars from colloidal dispersions is diagrammatically illustrated in Fig. 3. This dialyzer comprises a series of units, of which only two have been shown at X and Y. Each unit comprises two water chambers A and an intermediate molasses chamber B. Non-fibrous membranes 2 formed of hydrophilic colloidal material separate the chamber B from the adjacent chambers A.

In the operation of this dialyzer, molasses is introduced at the bottom of the chamber B in the first unit X as shown by the solid arrow M. The molasses is caused to flow upwardly through the chamber B and is conveyed therefrom to the bottom of the chamber B of the next or Y unit by any suitable conduit 4. The molasses flows upwardly through the chamber B in the unit Y, as shown by the solid arrow M', and is thence conveyed to the next unit and so on through the series of units.

Water is introduced into the tops of the chambers A of the units, as shown by the dotted arrows W, and is caused to flow downwardly through the chambers A and discharged at the bottom of each chamber. A common water supply pipe may be used to introduce the water into the tops of the chambers A of all of the units. Likewise a common pipe may be used to receive the water from the bottom of the chambers A of all of the units.

During the flow of the molasses through the chambers B, sugars are removed therefrom by osmosis with the water flowing preferably in the opposite direction through adjacent chambers A. Thus, the water discharged at the bottoms of the chambers A contains sugars which may be removed as heretofore described.

If desired, the first unit X, or the first two or more units of the series, may be used to remove salts from any molasses or other colloidal substance which contains a sufficient amount of salts to make the removal of such necessary or desirable. In this case, the membranes in the salts-removing units may be formed of any selective material, and the membranes in the sugar-removing units may be formed of hydrophilic colloidal material, as before. The dialyzate from the salts-removing units would, of course, not be mixed with the dialyzate from the subsequent sugar-removing units, but the two dialyzates would be separately conveyed to different points for utilization as previously described.

The colloidal dispersion may be caused to flow downwardly through the chambers B instead of upwardly, or upwardly through some of the chambers B and downwardly through others, if such is desired.

The sugars which are extracted from molasses or other colloidal dispersions in accordance with the present invention contain considerably less coloring matter than the original colloidal dispersion. It has been found that from 60 to 70% of the coloring matter is removed by dialysis through a non-fibrous membrane formed of hydrophilic colloidal material. This decolorizing or clearing action is further enhanced by the addition of a small amount of an acid to the original dispersion, for example, four or five grams of oxalic acid to each liter of molasses.

Throughout this specification and the claims, the term "sugars" is to be considered as including both monosaccharides and polysaccharides.

Since certain changes in carrying out the above process and in the construction set forth, which embody the invention may be made without departing from its scope, it is intended that all matter contained in the above description or shown in the accompanying drawing shall be interpreted as illustrative and not in a limiting sense.

Having described our invention, what we claim as new and desire to secure by Letters Patent is:

1. A process of extracting sugar from molasses by dialysis comprising passing molasses and water countercurrently on opposite sides of and in contact with a non-fibrous cellulose hydrate membrane, the molasses being maintained under a greater pressure than the water.

2. A process of extracting sugar from molasses by dialysis comprising passing molasses and a dialyzate on opposite sides of and in contact with a non-fibrous cellulose hydrate membrane.

3. A process of extracting sugar from molasses by dialysis which comprises dialyzing molasses with water through a non-fibrous cellulosic membrane which is a water-swelling material.

4. A process of extracting sugar from molasses by dialysis which comprises dialyzing molasses with water through a non-fibrous cellulose hydrate membrane, the molasses being maintained under a pressure greater than that of the water.

ROGER N. WALLACH.
JUSTIN ZENDER.